United States Patent [19]

Aylor, Jr. et al.

[11] Patent Number: 4,897,135

[45] Date of Patent: Jan. 30, 1990

[54] METHOD OF RECONSTRUCTING PIPE SYSTEMS USING FIBERGLASS LAMINATES

[75] Inventors: Harry H. Aylor, Jr.; Boyd A. Hirtz, both of Chesterfield, Mo.

[73] Assignee: Insituform Mid America, Inc., Chesterfield, Mo.

[21] Appl. No.: 139,817

[22] Filed: Dec. 29, 1987

[51] Int. Cl.⁴ ............................................. B32B 35/00
[52] U.S. Cl. .................................... 156/94; 29/402.09; 138/97; 138/98; 138/DIG. 9; 156/280; 156/294; 428/63; 428/438
[58] Field of Search ................. 29/402.09; 138/97, 98, 138/99, DIG. 9; 156/94, 294, 280; 428/63, 438

[56] References Cited

U.S. PATENT DOCUMENTS 3,424,203  1/1969  Rubenstein ............................ 138/98
4,576,205  3/1986  Morinaga et al. ..................... 138/98

OTHER PUBLICATIONS

Baltek Corp. Contourkore/Corrosion Control File, Date Files: 102, 114, 123, 130, 147, 77, 78, 80, 68, 88, 91, 92, 93.

IRPI Article, vol. 4, No. 5, May/Jun. 1985, High-Tech applications of balsawood in RP composites.

The Star, Mar. 1986, pp. 28–31, Baltek High Tech Sandwich to Go.

Baltek Corporation Data File 95, 96, 98, 109, 132 and 140.

Primary Examiner—Robert A. Dawson
Attorney, Agent, or Firm—Sandler & Greenblum

[57] ABSTRACT

A method of reconstructing fixed pipe systems (which cannot be rotated) by applying a fiberglass laminate utilizing overlapping sections.

10 Claims, 1 Drawing Sheet

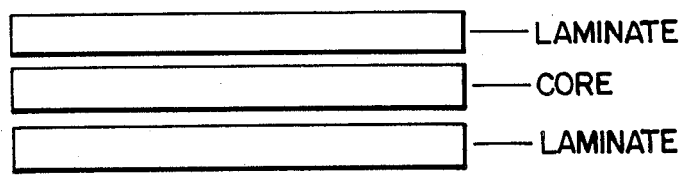
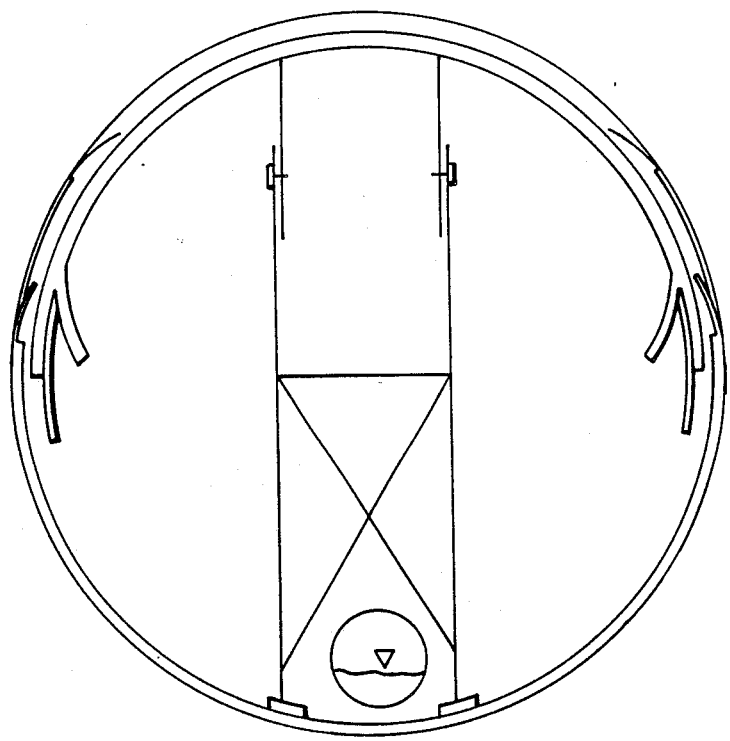

METHOD OF RECONSTRUCTING PIPE SYSTEMS USING FIBERGLASS LAMINATES

BACKGROUND OF THE INVENTION

I. Field of the Invention

The invention relates to a method of repairing large fixed passageways. In particular it is directed to the use of fiberglass sandwiches as a liner to effect the repair of concrete sewage and chemical pipes or tunnels which cannot be rotated.

II. Background of the Invention

Large diameter sewage and chemical pipes (at least 48 inch) are formed by utilizing cast concrete. The pipes are buried and have a life expectancy of up to eighty years. When such pipes develop leaks it is expensive to either replace or repair them.

Since these pipes are originally constructed from concrete, those of ordinary skill in the art have looked to conventional concrete techniques for means of repairing these concrete pipes. The traditional means of repairing large diameter sewage and chemical pipes is to apply a wire mesh to the interior surfaces and spray same with gunite. A limitation on this technique is that the repairs last only three to five years.

The use of fiberglass laminates has achieved substantial acceptance in a number of fields. The laminates may be used in sandwich composite construction using a lightweight core material. It is generally believed in the industry that it is not feasible to apply these laminates and/or composites in overhead applications. This applies to the repair of underground or other fixed pipes where the pipes cannot be rotated to allow conventional application of the laminates.

An object of the present invention is to provide a means of reconstructing large diameter underground pipes and ducts, thereby increasing the life of the pipe significantly. A second object of the invention is to provide a means of reconstructing large diameter underground pipes and ducts without seriously affecting the pipe and duct capacity. A third object of the invention is to provide an economical and efficient means of reconstructing large diameter passageways. A final object of the invention is to provide a means of applying a fiberglass sandwich to the overhead surface of an underground passageway, where rotation of the passageway is impossible.

SUMMARY OF THE INVENTION

A method of reconstructing a large diameter fixed passageway by applying a fiberglass sandwich to the upper portion of a 360 degree section of said passageway.

BRIEF DESCRIPTION OF THE DRAWINGS

FIG. 1 is a schematic of a typical fiberglass sandwich.

FIG. 2 illustrates the means of applying a fiberglass sandwich to the upper portion of an underground passageway.

DESCRIPTION OF THE PREFERRED EMBODIMENTS

The sandwich of the invention is formed and applied as follows:

Resin—The resin suitable for use is preferably a commercial grade polyester, vinylester or epoxy resin. The resin selected will depend upon the passageway environment. The amount of resin used will be based upon the resin selected and the properties desired.

Fillers and pigments—The resins used usually do not contain fillers except as required for viscosity control or fire retardance. Up to 5 percent by weight of thixotropic agents may be added to the resin for viscosity control. Resins may contain pigments and dyes. Antimony compounds or other fire retardant agents may be added as desired for improved fire resistance.

3 Reinforcing material—The reinforcing material usually is a commercial grade of glass fiber having a coupling agent which will provide a suitable bond between the glass reinforcement and resin.

Laminate—The laminate is comprised of a surfacing mat, structural layer and corrosion barrier. The surfacing mat may be a coat of resin. The structural layer may be alternate plies of woven roving and chopped strand mat. The corrosion barrier may be three or more layers of 1.5 ounce chopped strand with a minimum total thickness of 100 mils and is completed with the application of catalysed resin. The glass content of the corrosion barrier is preferably 25 to 30% glass by weight.

Sandwich—The sandwich is comprised of a laminate, a structural core and a second laminate (see FIG. 1) The structural core must have high shear, compressive and tensile strengths and moduli at densities much lower than the facings. In addition the core should exhibit reasonably low rates of water migration, should a breach of the facing occur and the core be in contact with water. The preferably core is balsa wood.

Cut edges—All cut edges are coated with resin so that no glass fibers are exposed and all voids filled. Structural elements having edges exposed to chemical environment are made with choppedstrand glass reinforcement only.

Joints—Finished joints are built up in successive layers and are as strong as the pieces being joined. The width of the first layer is at least 2 inches. Successive layers increase uniformly to provide the specified minimum total width of overlay which is to be centered on the joint. Crevices between jointed pieces are filled with resin or thixotropic resin paste, leaving a smooth inner surface. The interior of joints may also be sealed by covering with not less than 0.100 inch of reinforced resin material.

Surface hardness—The laminate has a barcol hardness of at least 90 percent of the resin manufacturer's minimum specified hardness for the cured resin.

Physical properties—The physical properties of these laminates are dependent on the percent of fiberglass content, fiberglass type and degree of resin cure.

| TYPICAL LAMINATE PROPERTIES | | | |
| --- | --- | --- | --- |
| Property (ASTM Test Method) | A[1] | B[2] | C[3] |
| Laminate thickness, inches | 0.15 | 0.32 | 0.43 |
| Glass content % (D-2584) | 26 | 32 | 33 |
| Flexural strength PSC (D-790) | 18,000 | 20,000 | 22,000 |
| Flexural modulus PSC (D-790) | 700,000 | 800,000 | 900,000 |
| Tensile strength PSC (D-638) | 10,000 | 12,000 | 14,000 |
| Tensile modulus PSC (D-638) | 800,000 | 1,000,000 | 1,200,000 |
| Hardness Barcol (D-2583) | | | |
| Density glcc (D-792) | | | |
| Coff of thermal expansion in/in/ C (D-696) $6 \times 10^{-5}$ | | | |

1. Construction: V-M-M-M-V           V = Veil
2. Construction: V-M-M-M-WR-M-    M = Chopped Mat
   WR-M-V
3. Construction: V-M-M-M-WR-M-    WR = Woven Roving -continued

TYPICAL LAMINATE PROPERTIES

WR-M-WR-M-V

The sandwiches are first applied to the bottom and side surfaces of the passageway. As shown in FIG. 2, in order to apply the sandwich to the overhead surfaces of the passageway a form is built which corresponds to the shape of the overhead surfaces. The top of the form is covered with plastic sheeting and the uncured sandwich is placed over the plastic sheeting. The form is raised until the laminate contacts the overhead surfaces of the passageway. The form remains in place until the sandwich cures, after which the form and plastic is removed.

It is important that the bottom and top sections of the sandwich overlap. This overlap is necessary in order to obtain a seal between the sections. The application of the sandwich in sections facilitates the use of a sandwich in rehabilitating large underground passageways.

We claim:

1. A method of reconstructing a large diameter fixed passageway by application of a fiberglass sandwich having a structural core layer comprising balsa wood sandwiched between fiberglass laminates to at least one 360 degree section of said passageway.

2. The method of claim 1 wherein said sandwich is applied in lengths less than 360 degrees.

3. The method of claim 1 wherein said laminates comprise chopped mat and woven roving fiberglass layers.

4. The method of claim 1 wherein said laminates are coated with a resin.

5. The method of claim 1 wherein said sandwich is applied in lengths less than 360 degrees.

6. The method of claim 5 wherein said sandwich is applied to a 360 degree section of passageway in two pieces.

7. The method of claim 1 wherein said passageway is concrete.

8. The method of claim 1 wherein said fiberglass laminates have a minimum thickness of at least 100 mils.

9. The method of claim 4 wherein said resin comprises polyester, vinylester or epoxy.

10. The method of claim 3 wherein the glass content of the laminate comprises from 25 to 30% by weight.

* * * * *